(12) United States Patent
Kfoury et al.

(10) Patent No.: US 8,700,070 B2
(45) Date of Patent: Apr. 15, 2014

(54) SYSTEM AND METHOD FOR ADAPTIVE MESSAGE RETRANSMISSION

(75) Inventors: George N. Kfoury, Carol Stream, IL (US); Vivek G. Naik, Deerfield, IL (US); Mohammed I. Qasim, Naperville, IL (US); Christopher R. Schmidt, Pinole, CA (US)

(73) Assignee: Motorola Mobility LLC, Chicago, IL (US)

( * ) Notice: Subject to any disclaimer, the term of this patent is extended or adjusted under 35 U.S.C. 154(b) by 1331 days.

(21) Appl. No.: 11/936,353

(22) Filed: Nov. 7, 2007

(65) Prior Publication Data

US 2009/0117924 A1    May 7, 2009

(51) Int. Cl.
*H04W 4/14* (2009.01)
*H04W 4/12* (2009.01)

(52) U.S. Cl.
USPC ............... 455/466; 455/412.1; 455/414.1

(58) Field of Classification Search
USPC ........ 455/412.1, 414.1, 423, 425, 466, 414, 1
See application file for complete search history.

(56) References Cited

U.S. PATENT DOCUMENTS

| | | | |
|---|---|---|---|
| 5,245,616 A | 9/1993 | Olson | |
| 5,878,056 A * | 3/1999 | Black et al. | 714/748 |
| 6,266,782 B1 | 7/2001 | Carter et al. | |
| 6,430,699 B1 | 8/2002 | Carter et al. | |
| 2002/0019956 A1 | 2/2002 | Carter et al. | |
| 2004/0048604 A1 * | 3/2004 | Idei | 455/414.1 |
| 2004/0236849 A1 * | 11/2004 | Cooper et al. | 709/224 |
| 2005/0048966 A1 * | 3/2005 | Semper | 455/425 |
| 2005/0124316 A1 * | 6/2005 | Islam et al. | 455/404.2 |
| 2005/0198156 A1 | 9/2005 | Cheng | |
| 2006/0019687 A1 | 1/2006 | Garg et al. | |
| 2006/0240850 A1 * | 10/2006 | Kaplan | 455/466 |
| 2007/0104193 A1 * | 5/2007 | Choi | 370/389 |
| 2007/0149213 A1 * | 6/2007 | Lamba et al. | 455/456.1 |

OTHER PUBLICATIONS

Upper Layer (LAyer 3) Signaling Standard foro cdma2000 Spread Spectrum Systems Revision C v.2.0 Jul. 23, 2004.*
Patent Cooperation Treaty, "PCT Search Report and Written Opinion of the International Searching Authority" for International Application No. PCT/US2008/079023 dated Apr. 24, 2009, 10 pages.
3GPP2 A.S0014-D V.1.0 "Interoperability Specification (IOS) for cdma2000 Access Network Interfaces—Part 4 (A1, A1p, A2 and A5 Interfaces)", Jun. 2007, 525 pages.

* cited by examiner

*Primary Examiner* — Marisol Figueroa

(57) ABSTRACT

A method and network controller (200) with a radio network controller (206) that transmits (302) a first signaling message to a communication device (108). The first signaling message includes extended information that some communications devices (108) are expected to be unable to process. The radio network controller (206) further transmits (312) a second signaling message that includes substantially all information that is contained within the first signaling message except for the extended information. The method and network controller (200) also includes a signaling message retransmission controller (208) communicatively coupled to the network controller, that identifies information contained within the extended information and indicates the extended information to the radio network controller (206).

7 Claims, 5 Drawing Sheets

SYSTEM AND METHOD FOR ADAPTIVE MESSAGE RETRANSMISSION

CROSS-REFERENCE TO RELATED APPLICATION

Not Applicable

FIELD OF THE INVENTION

The present invention generally relates to the field of data communication control, and more particularly relates to processing messages used to control and manage elements of a data communications network.

BACKGROUND OF THE INVENTION

Some communications standards provide a mechanism to allow systems in different countries to send extended information to various devices. One example are CDMA2000 standards, i.e., "3GPP2 C.S0005-C v2.0 Upper Layer (Layer 3) Signaling Standard for cdma2000 Spread Spectrum System, Release C; Jul. 23, 2004," including preceding and subsequent versions, that allow country specific information to be sent over the air interface to and from mobile communication devices ("mobile devices"). As an example, base stations of CDMA2000 wireless communications systems operating in Japan send country specific information that is not sent by CDMA2000 systems operating in other countries. Such country defined information (which is contained in, for example, special records of signaling messages) may be included in several control or signaling messages during call setup, in the middle of the call or during call release. As a particular example, Japan has defined Japan specific records, as may CDMA2000 wireless communications systems operating in other countries. Mobile devices, such as cellular phones, intended to operate in Japan are configured to receive and properly process such records.

Japan plans to start providing roaming services to mobile devices that are intended to operate in the United States, as well as in other non-Japanese countries. Some mobile devices do not properly process signaling or control messages that include records with Japan specific information. Mobile devices that are not intended to operate in Japan may reject signaling messages containing Japan specific information and/or fail to operate as expected as a result of the signaling message. Such unexpected behavior may result in the mobile device being placed in an unexpected state and disrupting the ability of that mobile device to initiate, terminate or receive a call.

Therefore, a method is needed to correct unexpected behaviors mentioned above by retransmitting signaling messages with problematic fields removed such that the receiver can correctly process the message.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
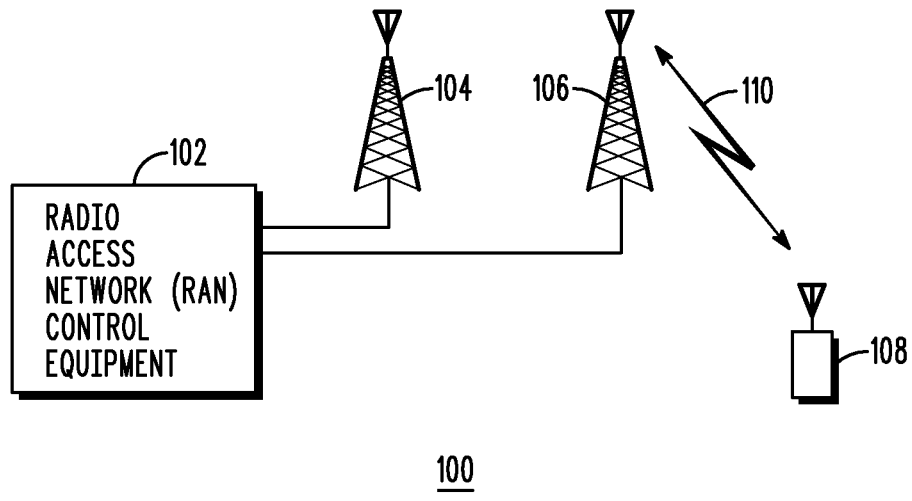
FIG. 1 illustrates a wireless communications system in accordance with one embodiment of the present invention.

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as illustrative examples for the claims and as a representative basis for teaching one skilled in the art to variously employ the present invention in virtually any appropriately detailed structure. Further, the terms and phrases used herein are not intended to be limiting; but rather, to provide an understandable description of embodiments of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Briefly, in accordance with one aspect of the present invention a method for managing message transmission in a wireless communications network includes transmitting a first signaling message to a mobile device. The first signaling message includes extended information that some mobile devices may be unable to process. The method further includes determining whether receipt and processing of the first signaling message has been successfully acknowledged. When receipt and processing of the first signaling message has not been successfully acknowledged, the method transmits a second signaling message that includes substantially all information contained in the first signaling message except for the extended information. In one embodiment, the message with extended information is preemptively followed by a version of the message without the extended information.

In accordance with another aspect of the present invention, a wireless network controller includes a radio network controller that transmits a first signaling message to a mobile device. The first signaling message includes extended information that some mobile devices may be unable to process. The radio network controller further determines whether receipt and processing of the first signaling message has been successfully acknowledged. When receipt and full processing of the first signaling message has not been successfully acknowledged, the radio network controller transmits a second signaling message that includes substantially all information contained within the first signaling message except for the extended information. The wireless network controller also includes a signaling message retransmission controller communicatively coupled to the radio network controller. The signaling message retransmission controller is adapted to identify information contained within the extended information and indicate the extended information to the radio network controller.

FIG. 1 illustrates a wireless communications system 100 in accordance with an embodiment of the present invention. The wireless communications system 100 includes a control function, identified as Radio Access Network (RAN) control equipment 102 that performs several control functions related to coordinating and managing data communications with and between mobile devices in the data network. The conventional operation of RAN control equipment 102 is known to those of ordinary skill in the relevant arts. Further functionality of the RAN control equipment 102 is described herein with respect to an embodiment of the present invention.

The RAN control equipment 102 communicates with one or more base stations, such as a first base station 104 and/or a second base station 106. As one example, the second base station is in wireless communication with one or more mobile devices 108 over a wireless link 110. Mobile devices 108 register with the RAN control equipment 102 and maintain one or more communication sessions with the RAN control equipment 102. The RAN control equipment 102 terminates the communication sessions with the mobile devices 108 as required. The RAN control equipment 102 controls a wireless communication network by, for example, controlling registration of mobile devices 108, maintaining wireless communication sessions between mobile devices 108, initiating termination of communication sessions and commanding wireless devices to hand off to another base station. Part of the control of the wireless communication network by the RAN control equipment 102 includes, for example, generating signaling messages to send to the mobile devices 108 and accepting signaling messages transmitted by the mobile devices 108.

In an embodiment of the present invention, the wireless communication system 100 uses signaling messages defined by the IS-2000 standard. The IS-2000 standard allows messages to include country specific records embedded in, for example, the IS-2000 extended record type-international information record. Unintended behavior of a mobile device 108 may result from sending extended record information to a device that is configured to operate, for example, in another country. Operation of one embodiment of the present invention allows the RAN control equipment 102 to accommodate mobile devices 108 that are not configured to handle country specific records embedded in the IS-2000 extended record type-international information record. In particular, the RAN control equipment 102 identifies a rejection of messages that include country specific records and retransmits the messages without the country specific records, as described below. In an embodiment of the invention, rejection of a message with country specific information is determined by receipt of a negative acknowledgement message that may or may not contain an indication of which record of the previously transmitted signaling message could not be properly processed. Rejection of a previously transmitted signaling message can also be determined by a failure to receive a response or acknowledgement message from the mobile device 108.

Figure 2:
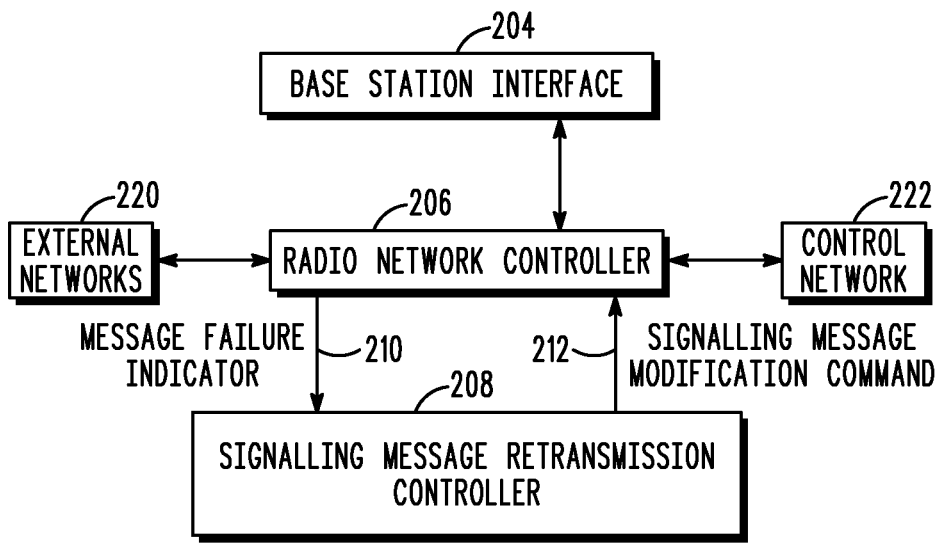
FIG. 2 is a block diagram of a Radio Access Network (RAN) control system in accordance with one embodiment of the present invention.

FIG. 2 is a block diagram of a RAN control system 200 in accordance with an embodiment of the present invention. The RAN control system 200 includes a radio network controller (RNC) 206 that, in one embodiment, is a programmable computer adapted to generate and process signaling messages that are exchanged between the RAN control system 200 and mobile devices 108. The RNC 206 communicates with a base station interface 204, which provides a communications interface between the RAN control system 200 and one or more base stations, such as the first base station 104 and the second base station 106. The base stations transmit and receive signaling messages and user data messages that are exchanged between the RAN control system 200 and the mobile devices 108. In the present embodiment described, the RAN control system 200 communicates with one or more base stations. In further embodiments of the present invention, processing that is described below as performed by the RAN control system 200 can be distributed into controllers that are located at each base station. One embodiment of the present invention operates by performing the below described processing at any location that air interface messages are processed.

User data exchanged between mobile devices 108 is communicated through external networks 220. Control information for the RAN control system 200 is communicated to central controllers, such as handset management data bases, through a control network 222.

The RNC 206 is also in communication with a signal message retransmission controller (SMRC) 208. The RNC 206 provides a message failure indicator 210 to the SMRC 208. The message failure indicator 210 indicates receipt of one of a variety of messages from the receiver, such as a NAK msg, a NAK msg with cause codes, a message acknowledgement timeout, and the like.

When the message failure indicator 210 indicates a signaling message timeout or message receipt rejection, the SMRC 208 will command the RNC 206 to remove data records from signaling messages sent to a mobile device. The SMRC 208 uses the information communicated within the message failure indicator 210 and retransmission rules that are pre-configured into the SMRC 208 to determine how to modify the message for a subsequent transmission attempt. In some embodiments of the present invention, the SMRC 208 is configured to command multiple transmission attempts with a different message modification for each attempt. In other embodiments of the present invention, the initial message transmission and/or message retransmissions include the immediate transmission of two or more different versions of a transmitted message in an attempt to ensure that the format of one of the different versions can be successfully received.

The RNC 206 accepts modified signaling message commands 212 from the SMRC 208. The commands 212 specify which records to remove from retransmitted messages. In one embodiment, the SMRC 208 commands the removal of records that were either indicated as causing a rejection of a signaling message by the destination mobile device 108 or commands the removal of pre-defined compatibility problem message records, such as country specific records. The operation to remove the message records is described in more detail below.

Figure 3:
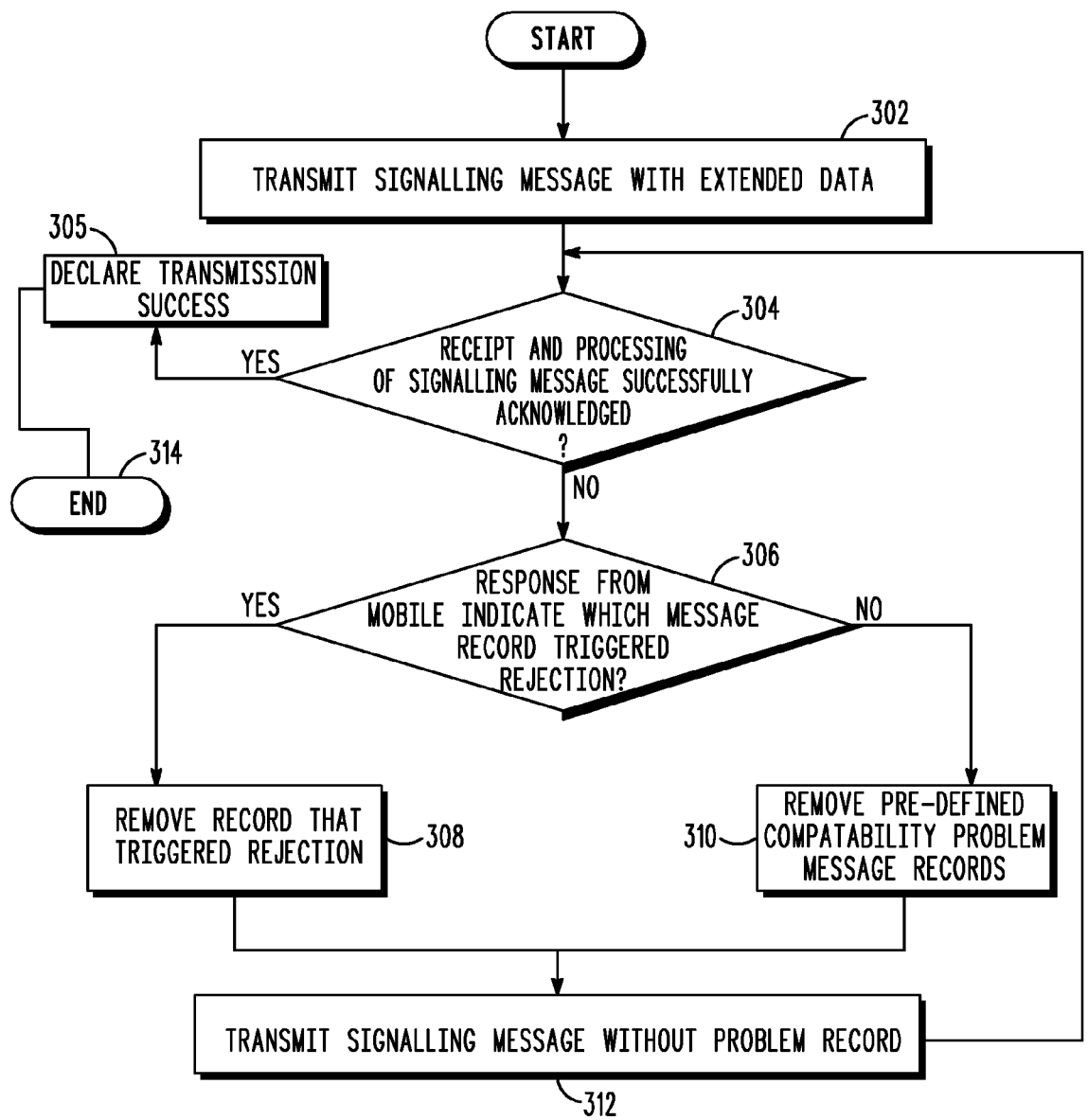
FIG. 3 is a signaling message modification process flow diagram in accordance with a first embodiment of the present invention.

FIG. 3 is a signaling message modification process flow diagram 300 in accordance with a first embodiment of the present invention. At step 302, a signaling message with extended data is transmitted from a RAN control equipment 102 to a mobile device 108. Extended data may be embedded in a signaling message in a system that uses a messaging protocol that allows an extended record type such as an international information record to be embedded in, for example, an Alert With Information (AWI) message. Systems that transmit AWI messages with country-specific information may encounter difficulty when operating with mobile devices 108 provisioned to operate in other countries. For example, a mobile device 108 provisioned to operate in the United States may not be configured to properly process an AWI message that contains Japan specific information and will likely reject the message. The signaling message modification process flow 300 operates to accommodate mobile devices that cannot properly process country specific data. Upon determining that a mobile device 108 has rejected a message with extended data, the process either retransmits the AWI message without the country specific information or transmit an equivalent message to perform the same function, where that equivalent message does not contain country specific information. One example of an equivalent message is a Flash/Extended Flash with Information message.

Referring back to FIG. 3, at step 304, the process determines whether receipt and processing of the transmitted message was successfully acknowledged by the mobile device 108. In one embodiment of the present invention, acknowledgement by the mobile device 108 is performed according to a defined communications standard under which the radio access network and the mobile device are operating. If receipt and processing of the signaling message are successfully acknowledged by the mobile device, at step 305, the process declares the transmission a success and ends at step 314. If receipt and processing of the transmitted message were not successfully acknowledged by the mobile device 108, the process flows to step 306.

In one embodiment of the present invention, the mobile device 108 responds to unsuccessful reception or processing of a message received from the RAN control equipment 102 by sending a response message containing an indication of the data field, or record, in the received signaling message that could not be processed. As previously mentioned, country-specific information in an AWI message may not be properly processed by a mobile device. Thus, in the present embodiment, the response message from the mobile device 108 would indicate the country specific information as the data field or record that could not be processed. An example of such a response is defined by the IS-2000 standard and is referred to as the Mobile Station Reject Order. The mobile station reject order identifies a variety of reasons for the rejection, and in some cases identifies the specific fields that caused the rejection. In one example, the mobile station reject order identifies the Record Type that caused the message to be rejected.

Referring back to FIG. 3, at step 306, the process determines whether the response message from the mobile device 108 to the previously transmitted message (signaling message) includes an indication of the message record that triggered rejection of the message. If the answer is yes, at step 308, the record that triggered the rejection is removed. If the response message from the mobile device 108 does not contain an indication of the message record that triggered rejection of the signaling message (or if the mobile device 108 did not send a response or acknowledgement message for the signaling message), at step 310, the process removes one or more pre-defined records or optional message fields of the signaling message that are suspected to have triggered the rejection. The pre-defined records or optional message fields to remove are determined by pre-defined rules configured within the SMRC 208. In one embodiment of the present invention, records that contain country specific information are pre-defined to be suspected of triggering a rejection of received AWI messages because mobile devices that are configured for operation in other countries may improperly respond to that information. In the event that an AWI message containing a record with country specific information is rejected by a mobile device 108 but the mobile device 108 fails to respond with a message indicating the record that triggered the failure, or fails to respond to the AWI message transmission at all, the radio access network first assumes that the record with country specific information in the AWI message is the cause of the reception failure and removes that field from the message prior to retransmission.

At step 312, the method transmits the signaling message that was previously transmitted but with the problem record removed (above described data). In alternate embodiments of the present invention, an equivalent message that performs the same function may be transmitted instead. As an example, a system that complies with the IS-2000 standard transmits a Flash or a Flash with Information message in response to a rejection of an AWI message with country specific data. After transmission of the message with the problem data removed or transmission of an equivalent message, the process returns to step 304 to determine whether receipt and processing of the transmitted message was successfully acknowledged.

Figure 4:
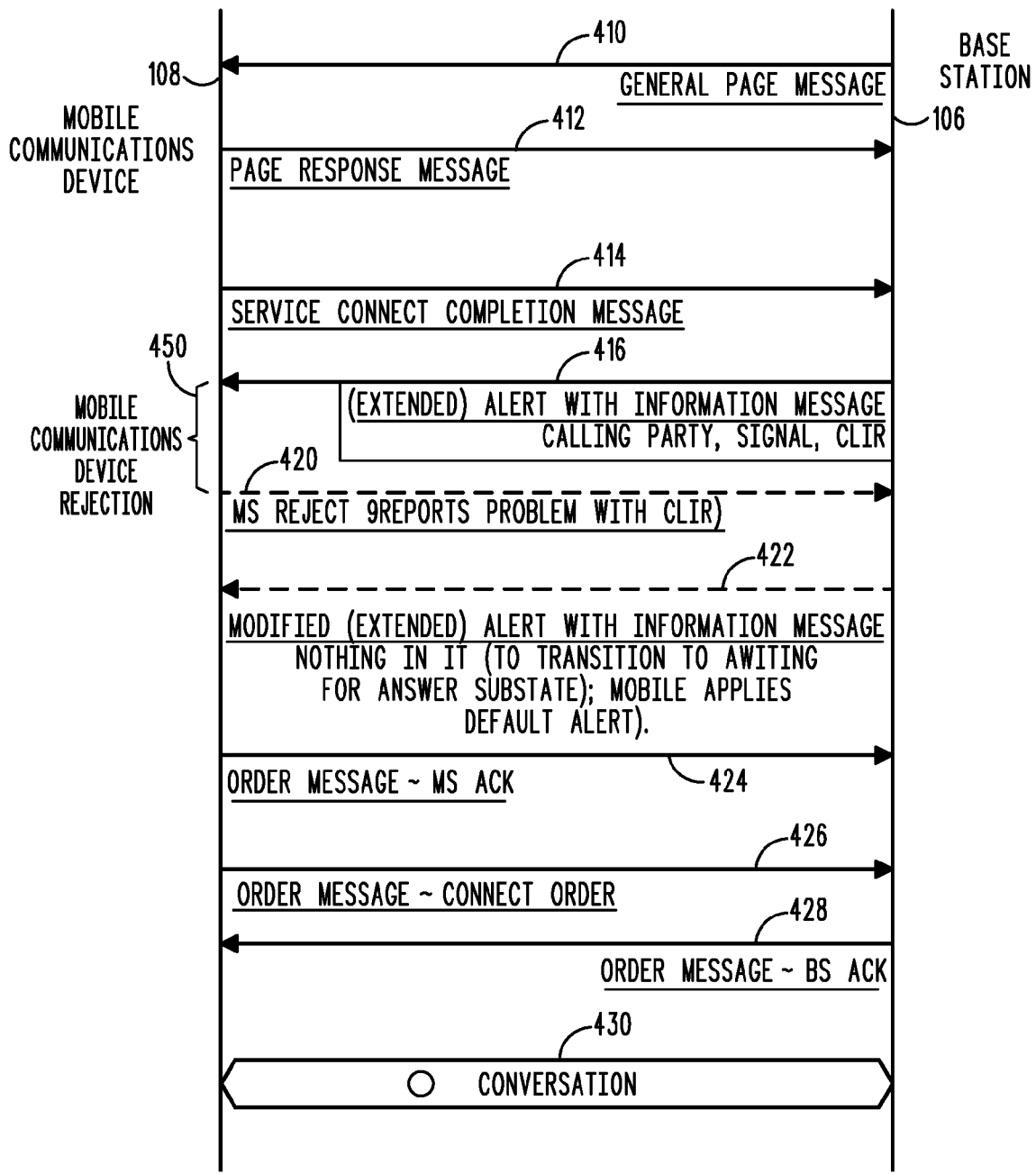
FIG. 4 illustrates a message exchange including signaling message modification in accordance with the first embodiment of the present invention.

FIG. 4 illustrates a message exchange 400 including signaling message modification in accordance with one embodiment of the present invention. The message exchange 400 illustrates one message exchange between a base station 106 and a mobile device 108, such as over wireless link 110. The message exchange 400 begins with a general page message 410 transmitted from a base station 106 to a roaming mobile device 108. The general page message 410 is successfully received by the mobile device 108 and it sends a page response message 412. A service connect completion message 414 is also transmitted from the mobile device 108 to the base station 106.

In response to the service connect completion message 414, the base station sends an (extended) alert with information message 416 to the mobile device 108. The message 416 contains an indication of the calling party, signal, and a Caller Line Identification Restriction (CLIR) record. In the present example, the mobile device 108 cannot properly process the CLIR record contained within the (extended) alert with information message 416, and rejects the message. In particular, the mobile device 108 transmits an MS reject message 420 to the base station 106. The exchange of the (extended) alert with information message 416 and the MS reject message 420 constitutes a mobile device rejection 450 of a received command message. In one embodiment, the MS reject message 420 contains an indication of the message record, i.e., the CLIR record, that triggered the rejection of the message.

In response to receiving the MS reject message 420, the base station 106 transmits a modified (extended) alert with information message 422 with the CLIR record removed. Next, the base station 106 transitions to a waiting for answer sub-state and the mobile device 108 transitions to the answer sub-state and rings.

When mobile device 108 receives the modified (extended) alert with information message 422, it is able to properly decode the data contained within the modified message. The mobile device 108 transmits an Order Message~MS ACK 424 and an Order Message~Connect Order 426 to the base station 106. In response to these messages, the base station 106 transmits an Order Message~BS ACK message 428 to the mobile device 108 to complete the establishment of the communications session. A conversation 430 is then conducted during the established communications session.

Figure 5:
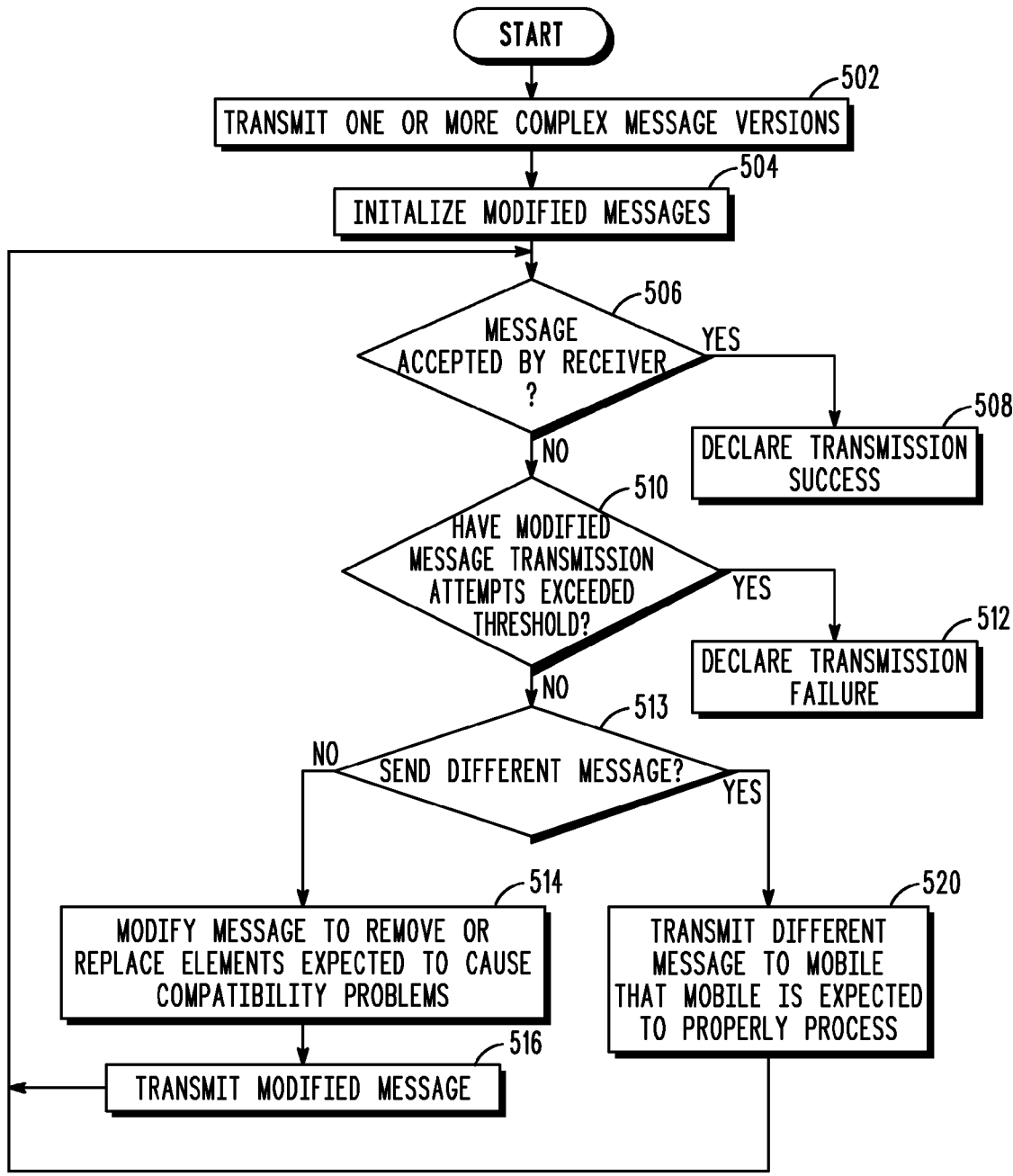
FIG. 5 is a signaling message modification process flow diagram in accordance with a second embodiment of the present invention.

FIG. 5 illustrates a general message transmission processing flow 500, in accordance with one embodiment of the present invention. The general message transmission processing flow 500 begins at step 502 by transmitting one or more complex message versions. Complex messages include, for example, messages defined to have several data elements where some of those several data elements are expected to cause processing difficulty in some types of receivers. Such processing difficulties are caused by, for example, older message processing software known to still be operating in some receivers, the existence of known receivers that do not comply with a communications standard being used by the transmitter, and other such reasons.

In one embodiment, an initial transmission to a receiver includes a transmission of multiple versions of similar messages, the multiple versions having different formats and data content. The multiple message formats are transmitted to increase the probability that the message data will be properly received by the various types of receivers expected to receive the messages. The number and format of the multiple messages to send initially is pre-configured by, for example, pre-programming or pre-provisioning the transmitter.

The general message transmission processing flow 500 continues at step 504 by initializing modified messages to transmit in the event of a failure of previously transmitted messages. The initialization format and number of messages to transmit on subsequent tries are defined in one embodiment by pre-configuration of the transmitter control logic. The process 500 continues at step 506 by determining whether the complex message has been accepted by the receiver. This determination is performed in one embodiment by, for example, receipt of a negative acknowledgment or timeout for receipt of an acknowledgement. If the complex message is determined to have been accepted by the receiver, the process declares transmission success at step 508.

If the complex message is determined to not have been accepted by the receiver (as might be accomplished by, for example, receipt of a negative acknowledgement or other means) the process determines at step 510 whether modified message transmission attempts have exceeded a threshold. As described above with respect to one embodiment of the invention, the transmitter is pre-configured to attempt retransmission of data contained in a complex message by transmitting, either immediately or after successive failures of a subset of retransmission formats, at least some of the data of the complex message in a similar message of various different formats or in a completely different message format. A maximum number of retransmission attempts can be preconfigured in the transmitter as the threshold of this processing step. If at step 510 the message transmission attempts were determined to exceed the threshold, the process declares transmission failure at step 512.

If at step 510 the message transmission attempts have not exceeded the threshold, at step 513, the process determines whether a different message should be sent. If the answer is no, the process modifies (step 514) the complex message to remove or replace elements that are expected to cause compatibility problems. As a general matter, the message can be modified in this step to include generation of different messages that contains some of the data or some similar but different data as was initially transmitted. At step 516, the modified message is transmitted to the receiver and processing returns to step 506 to determine whether the complex message has been accepted by the receiver.

Referring back to step 513, if a different message should be sent, the process transmits (step 520) a different message to the mobile device (i.e., a message that the mobile device is expected to properly process) and processing returns to step 506 to determine whether the different message has been accepted by the receiver.

Figure 6:
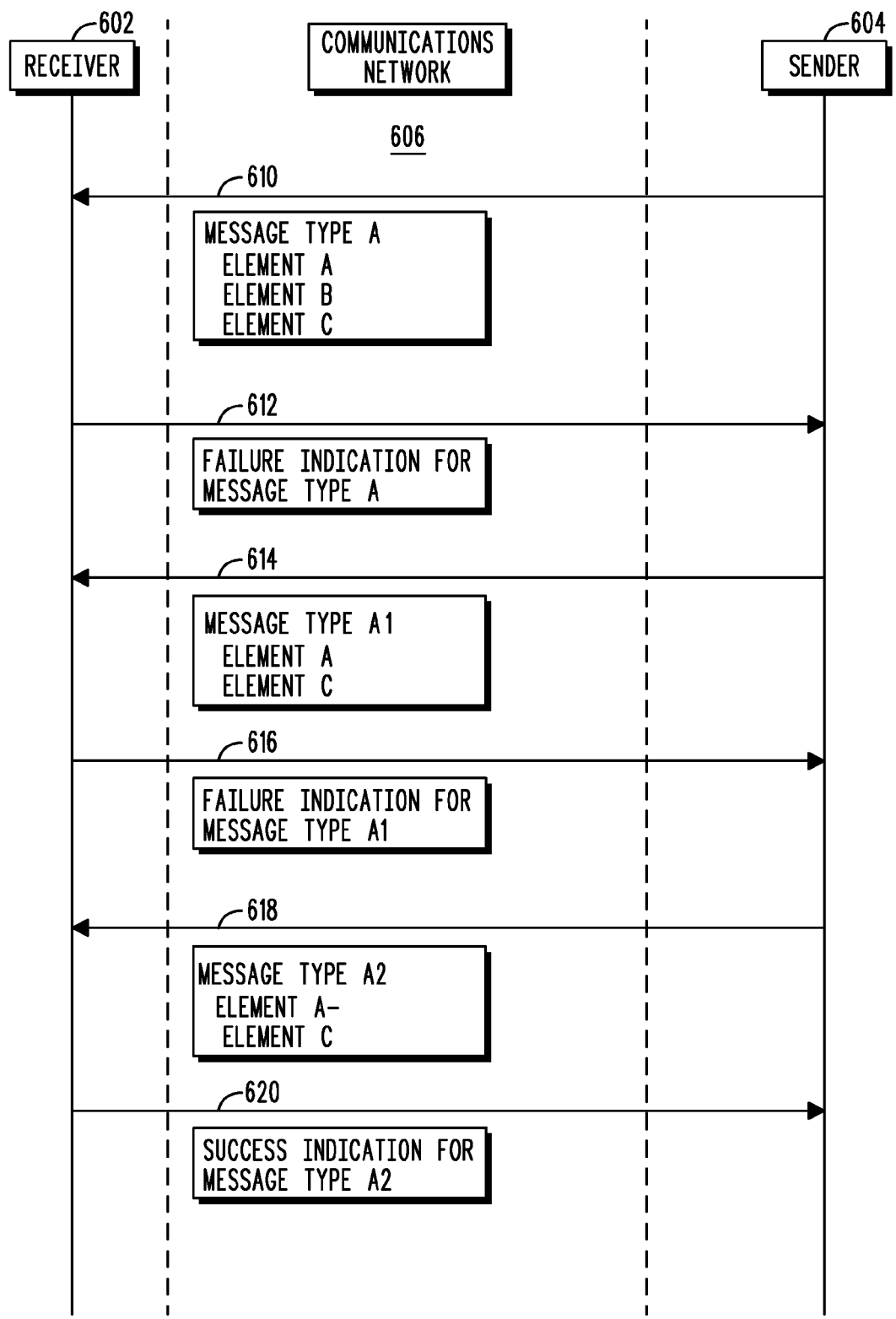
FIG. 6 illustrates a message exchange including signaling message modification in accordance with the second embodiment of the present invention.

FIG. 6 illustrates a general message exchange 600, in accordance with one embodiment of the present invention. The general message exchange 600 illustrates message exchanges between a receiver application 602, such as an application resident on a mobile device 108 described above, and a sender application 604, such as an application resident on the RAN 102 described above, through a communications network 606. The general message exchange 600 begins with the sender application 604 sending message type A 610 with elements A, B, and C, to a receiver application 602 over the communications network 606.

In one example, the receiver application 602 receives message type A 610, but cannot process the information in, for example, element A of the message. A response message 612 indicating that the receiver application 602 failed to process message type A 610 is returned to the sender application 604. Alternatively, the receiver application 602 simply discards the message, causing the sender application 604 to detect a failure due to a timeout for receiving a response from the receiver application 602.

In the current example, the sender application 604 received the indication that the receiver did not process message type A 610. Based on pre-programming or pre-provisioning of the sender application 604, the sender application 604 determines a type of message to retransmit. In this example, if a receiver fails to process message type A 610, for the current state of the application in the receiver and the application in the sender, and given the type of sender application 604 and the type of receiver application 602, and given that so far no alternative form of message type A has been sent to receiver application 602, the sender application 604 determines that a modified version of message type A 610 should be transmitted again, but without element B. The modified message is Message type A1 614 and is transmitted from sender application 604 to receiver application 602.

For example, when the sender detects that a message was not processed as expected by the receiver, information about the application or stage of the transaction can be used to determine what the application does next. Information about the application can be, for example, whether a call is in the process of being set up or whether data is being exchanged. Information about the stage of transaction can be, for example, that the failed message occurred at the beginning, middle or end of the transaction.

Referring back to FIG. 6, the receiver application 602 receives Message Type A1, which is similar to message type A but without element B, but is still unable to process information in the remaining element A of the message. A second failure indication message 616, indicating that the receiver application failed to process message type A1, is returned to the sender application 604. Alternatively, the receiver application 602 can simply discard the message type A1 614 and the sender will detect a failure for lack of receiving a response from the receiver application 602.

In the current example, the sender application 604 receives the second failure indication message 616 indicating that the receiver did not process message type A1. Based on pre-programming or pre-provisioning, the sender application 604 determines that if a receiver application 602 fails to process message type A1, for the current state of the application in the receiver and the application in the sender, and given the type of sender and the type of receiver, and given that one alternative form of Message Type A 610 has been sent (i.e., message type A1), the sender application 604 should transmit another modification of message type A 610, but this time as message type A2 618, which includes element A modified to be element A-, and also without element B.

The receiver application 602 receives message type A2 618, this time with element A- and still without element B, and can now successfully process message type A2 618. The receiver application 602 sends a success indication message 620 to the sender application 604 indicating that message type A2 was successfully processed.

The present invention may be embedded in a computer program product, which comprises all features enabling implementation of the methods described herein, and which when loaded in a computer system is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least one computer readable medium that allows the computer to read data, instructions, messages or message packets, and other computer readable information. The computer readable medium may include non-volatile memory, such as ROM, Flash memory, Disk drive memory, CD-ROM, SIM card, and other permanent storage. Additionally, a computer medium may include, for example, volatile storage such as RAM, buffers, cache memory, and network circuits.

The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Reference throughout the specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout the specification are not necessarily all referring to the same embodiment. Furthermore, the particular features, structures, or characteristics may be combined in any suitable manner in one or more embodiments. Moreover these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

While the various embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for managing message transmission in a wireless communications network, the method comprising:
   transmitting a first signaling message to a mobile device, the first signaling message comprising extended information, wherein the extended information comprises country specific information that is transmitted within messages conforming to a wireless communications protocol in fewer than all countries;
   determining whether receipt and processing of the first signaling message has been successfully acknowledged;
   when receipt and processing of the first signaling message has not been successfully acknowledged,
   receiving a response to the first signaling message from the communication device indicating that the communication device rejected the first signaling message because of the country specific information; and
   transmitting a second signaling message that comprises substantially all information contained within the first signaling message except for the country specific information.

2. The method of claim 1, wherein the first signaling message complies with an IS-2000 protocol definition and wherein the country specific information comprises data contained within an Extended Record Type-International information record.

3. The method of claim 1, wherein the first signaling message complies with an IS-2000 protocol definition and is an Alert with Information message containing the country specific information in an Extended Record Type-International information record; and
   wherein the second signaling message comprises one of a flash message and a flash with information message, the one of the flash message and the flash with information message having the information Extended Record Type-International information record removed.

4. A wireless network controller, comprising:
   a radio network controller configured to:
      transmit a first signaling message to a mobile device, the first signaling message comprising extended information, wherein the extended information comprises country specific information that is transmitted within messages conforming to a wireless communications protocol in fewer than all countries;
      determine whether receipt and full processing of the first signaling message has been successfully acknowledged; and
      when receipt and processing of the first signaling message has not been successfully acknowledged,
      receive a response to the first signaling message from the communication device indicating that the communication device rejected the first signaling message because of the country specific information,
      transmit a second signaling message that comprises substantially all information contained within the first signaling message except for the country specific information; and
   a signaling message retransmission controller communicatively coupled to the radio network controller, configured to identify information that is contained within the country specific information and indicate the country specific information to the radio network controller.

5. The wireless network controller of claim 4, wherein the first signaling message complies with an IS-2000 protocol definition and wherein the country specific information comprises data contained within an Extended Record Type-International information record.

6. The wireless network controller of claim 4, wherein the first signaling message complies with an IS-2000 protocol definition and is an Alert with Information message containing the country specific information in an Extended Record Type-International information record, and
   wherein the second signaling message comprises one of a flash message and a flash with information message, the one of the flash message and the flash with information message having the country specific information Extended Record Type-International information record removed.

7. A method for managing message transmission in a mobile device, the method comprising:
- receiving, by a mobile device, a first signaling message comprising extended information, wherein the extended information comprises country specific information that is transmitted within messages conforming to a wireless communications protocol in fewer than all countries;
- in response to receiving the first signaling message, sending by the mobile device, to a wireless network controller, a message indicating that the mobile device rejected the first signaling message because of the country specific information; and
- receiving a second signaling message that comprises substantially all information contained within the first signaling message except for the country specific information.

* * * * *